No. 12,444. REISSUED JAN. 30, 1906.

M. A. WINGET, DEC'D.

WINGET CONCRETE MACHINE COMPANY, ASSIGNEE.

MACHINE FOR MOLDING CONCRETE BODIES.

APPLICATION FILED JUNE 2, 1905.

3 SHEETS—SHEET 1.

WITNESSES:

Chas. K. Davies

E. Anne Tallent

Marion A. Winget INVENTOR

Winget Concrete Machine Co.

assignee.

By Shepherd and Parker

Attorneys.

No. 12,444. REISSUED JAN. 30, 1906.

M. A. WINGET, DEC'D.

WINGET CONCRETE MACHINE COMPANY, ASSIGNEE.

MACHINE FOR MOLDING CONCRETE BODIES.

APPLICATION FILED JUNE 2, 1905. 3 SHEETS—SHEET 2.

WITNESSES:
Chas. K. Davis.
E. Hunt Talbert

Marion C. Winget
INVENTOR
Winget Concrete Machine Co.
Assignee.
BY Shepherd & Parker
Attorneys.

No. 12,444. REISSUED JAN. 30, 1906.

M. A. WINGET, DEC'D.

WINGET CONCRETE MACHINE COMPANY, ASSIGNEE.

MACHINE FOR MOLDING CONCRETE BODIES.

APPLICATION FILED JUNE 2, 1905.

3 SHEETS—SHEET 3.

WITNESSES:
Chas. K. Davies
R. Hunn Talbert

Marion A. Winget
INVENTOR
Winget Concrete Machine Co
assignee
By Shepheard & Parker
Attorneys

UNITED STATES PATENT OFFICE.

WINGET CONCRETE MACHINE COMPANY, OF COLUMBUS, OHIO, ASSIGNEE, BY MESNE ASSIGNMENTS, OF MARION A. WINGET, DECEASED.

MACHINE FOR MOLDING CONCRETE BODIES.

No. 12,444. Specification of Reissued Letters Patent. Reissued Jan. 30, 1906.

Original No. 694,123, dated February 25, 1902. Application for reissue filed June 2, 1905. Serial No. 263,496.

*To all whom it may concern:*

Be it known that MARION A. WINGET, formerly of Columbus, in the county of Franklin and State of Ohio, now deceased, did invent certain new and useful Improvements in Machines for Molding Concrete Bodies; and it is hereby declared that the following is a full, clear, and exact description of the invention, such as will enable others skilled in the art to which it appertains to make and use the same.

This invention relates to the improvement of machines for forming concrete blocks, and has particular relation to machines for forming blocks of this character for building purposes, although the same may be adapted for the formation of street-paving blocks or other similar composition or clay bodies.

The objects of this invention are to provide a simple, reliable, and effective machine for the formation of said blocks having an improved construction and arrangement of parts, the details of which will be more fully set forth hereinafter. These objects are accomplished in the manner illustrated in the accompanying drawings, in which—

Figure 1:
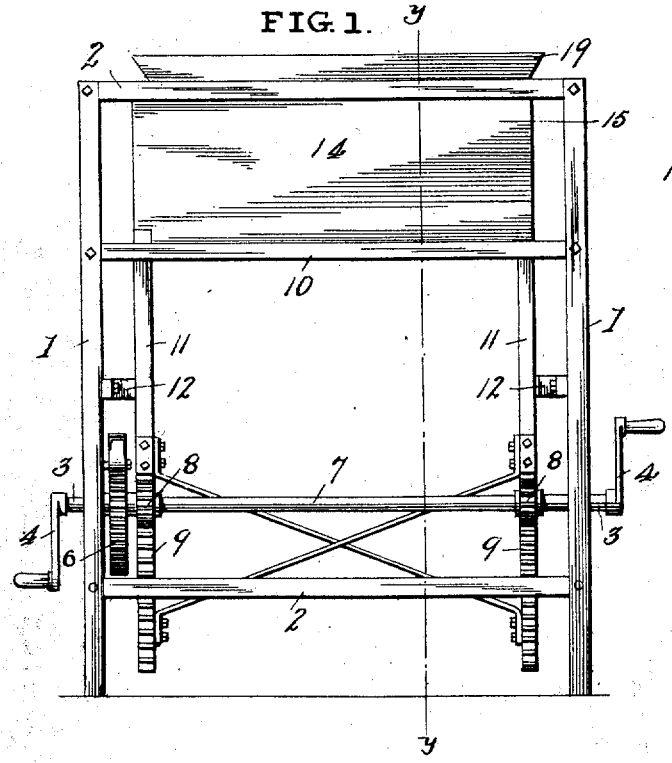
Figure 2:
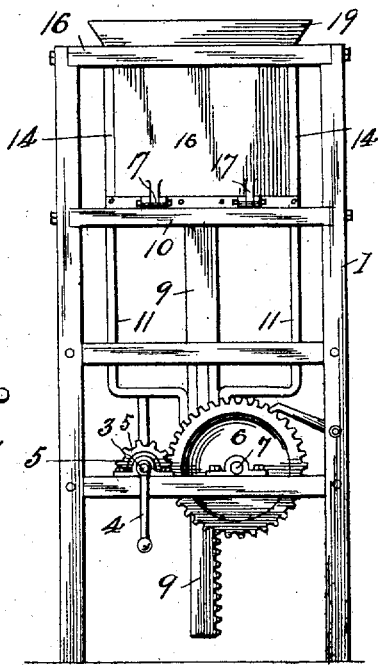
Figure 3:
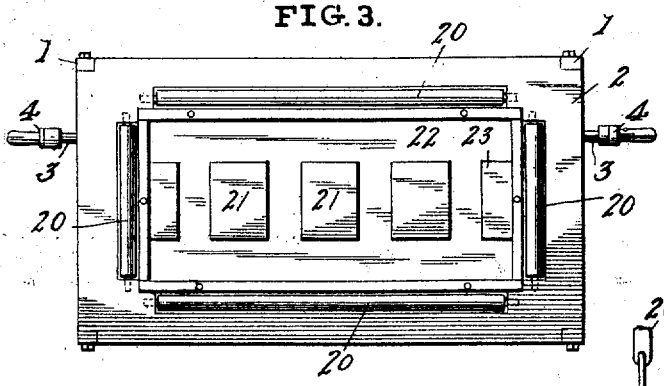
Figure 4:
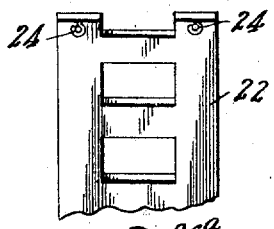
Figure 5:
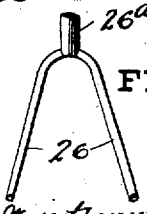
Figure 6:
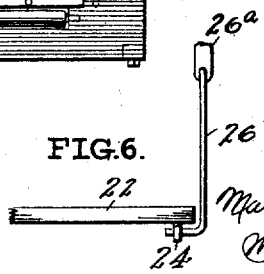
Figure 7:
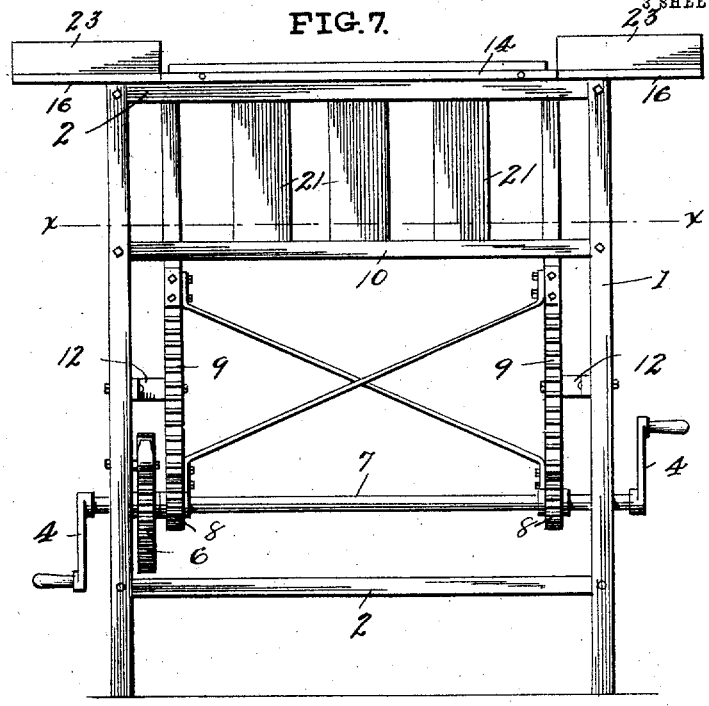
Figure 8:
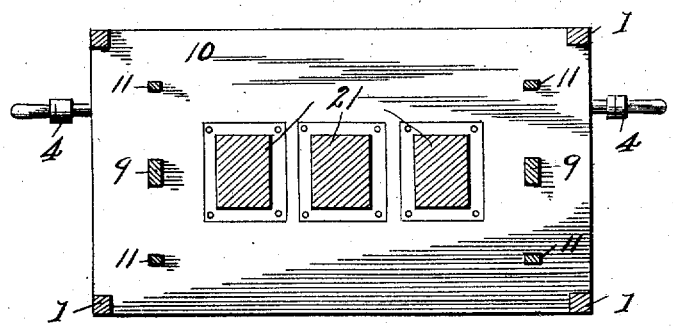
Figure 9:
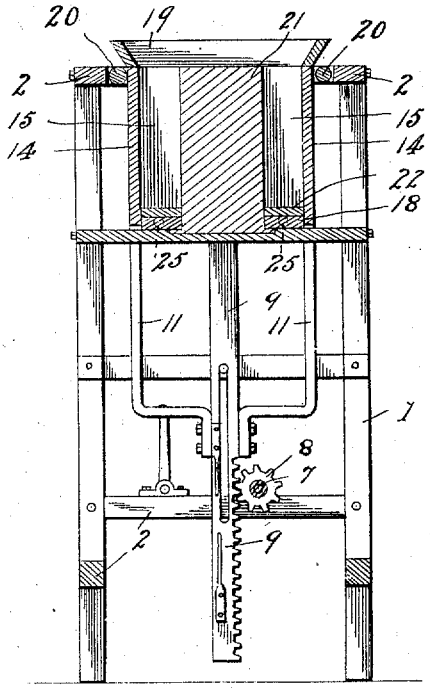
Figure 10:
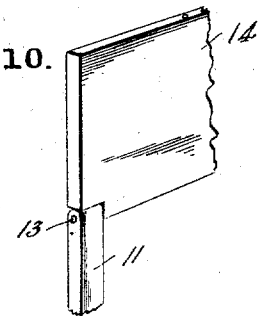
Figure 11:
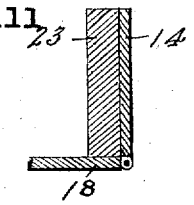
Figure 12:
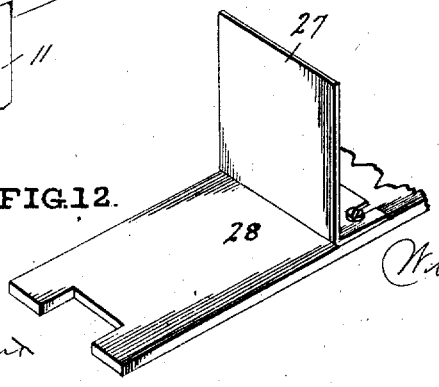

Figure 1 is a side elevation of the improved machine, showing the movable parts in their lowered positions. Fig. 2 is an end view of the same. Fig. 3 is a plan view with the flaring hopper-top removed. Fig. 4 is a view in perspective of a portion of the mold-board. Fig. 5 is a detail view in elevation of a tool which is employed in removing the mold-board. Fig. 6 is a view in elevation of a portion of the mold-board, showing said tool engaged therewith. Fig. 7 is a side elevation of the machine, showing the mold-box in its elevated position and with its sides and ends thrown open. Fig. 8 is a sectional view on line *x x* of Fig. 7. Fig. 9 is a sectional view on line *y y* of Fig. 1. Fig. 10 is a detail view in perspective, illustrating the hinge connection of one of the mold-box-supporting yoke-arms with the mold-box body. Fig. 11 is a sectional view through one of the mold-box ends, and Fig. 12 is a detail view in perspective of a modified form of mold-board.

Similar numerals refer to similar parts throughout the several views.

In carrying out this invention a suitable framework comprising vertical standards or uprights 1 and cross-pieces 2, which connect said standards, is employed. Between two of the lower cross-pieces is journaled a horizontal shaft 3, and on the ends of said shaft are carried crank-handles 4. Mounted on shaft 3 on the inner side of one of the frame-standards is a pinion 5, the latter gearing with a gear-wheel 6, carried on one end of a shaft 7, which runs parallel with the shaft 3, said shaft 7 carrying on opposite sides of the center of its length pinion-wheels 8. The teeth of these pinion-wheels mesh with the teeth of vertical rack-bars 9, the latter adapted to extend upward, as shown, through openings formed in a stationary horizontal floor or base plate 10. With opposite sides of each of the rack-bars 8 are connected the inturned arms of upwardly-extending yokes 11. The arms of these yokes may pass loosely through suitable guides 12, which project from the frame-standards 1, and the upper ends of the said yoke-arms are, as indicated more clearly at 13 in Fig. 10 of the drawings, hinged or pivoted to the ends of the sides 14 of a mold-box 15, the latter being adapted to extend upwardly between the top frame-bars 2. This mold-box 15 consists of the sides 14 and end pieces 16, the lower portions of which end pieces are hinged, as indicated at 17, to a bottom plate 18, which is adapted to bear upon the upper side of the stationary base-plate 10.

The mold-box 15 is adapted to have suitably, although detachably, supported thereon a flaring-top extension or hopper. Between the inner sides and ends of the stationary top frame of the machine and the sides and ends of the mold-box are journaled in said top frame horizontal rollers 20. (See Figs. 3 and 9.) Fixed in connection with the rigid base-plate 10 are the bases of the desired number of upwardly-projecting cores 21, these cores extending, as shown, through the plate 18 and through core-openings formed in the mold-board 22. In Fig. 7 of the drawings is shown an additional core 23, mounted vertically on the inner side of each of the ends 16 of the mold-box; but it is obvious that these cores may project upward from the fixed base 10, as prescribed for the cores 21.

In constructing the mold-board 22 suitable eyepieces or loop projections 24 are provided on the under side of each end thereof, which may extend within recesses or pockets 25, formed in the upper side and end portions of the plate 18, thus permitting the under surface of the mold-board to contact with the upper surface of said plate.

When the mold-box and rack-bars are in their lowered position, it will be seen that the sides and ends of the mold-box will stand in vertical positions and that they will be held against outward movement by contact with the rollers 20. Assuming that said mold-box is thus supported in its lower position, the material from which the building or other block is to be produced is introduced into the mold-box through its mouth and said mold-box filled to the desired depth about the cores. By then rotating the shafts 7 through the turning of the crank-handles 4 the rack-bars 9, together with the mold-box and bottom plate, are raised, owing to the gear engagement of the pinions 8 with the teeth of said rack. When the mold-box has thus been elevated until the lower portions of the sides and ends thereof are beyond the centers of the rollers 20, it is obvious that the hopper 19 being removed said sides and ends will drop outward to the positions indicated in Fig. 7 of the drawings and that the block previously formed within the hopper will thus be exposed in position for removal. In removing said block a tool, such as is indicated in Fig. 5 of the drawings, which consists of a central handle portion 26[a], having terminal forks 26, the ends of which are turned outward and adapted to be detachably engaged with the eyes 24 in the ends of the mold-board, is preferably employed.

It will be observed in connection with the above-described operation that the cores are stationary and that the material forming the block is lifted upward from about said cores, thereby forming the core-openings in the block in a manner which is the reverse of that ordinarily employed.

In Fig. 12 of the drawings there is shown a modification in the construction of the mold-board which consists in providing the same with an angular plate 27 of suitable form, the base of which is adapted to be secured to the mold-board, which in this instance is indicated at 28. It will be understood that any desired form of plate may be detachably or adjustably secured upon said board 28 for the purpose of severing the block or limiting the same in size by permitting said plate 27 to form when the mold-box is lowered a partition for the latter. It will also be understood that the plate 27 may extend upon the mold-board diagonally or otherwise for the purpose of changing the outline of the block, thereby permitting building-blocks of different shapes to be formed. The mold-board 28, although shown without core-openings, may be provided with the same, if desired, and used in conjunction with the cores, said plate being arranged between the latter.

From the construction herein shown and described it will be seen that a simple, reliable, and effective mechanism is provided which is particularly adapted for the formation of concrete or other composition blocks for building purposes, although it is evident that the same may be employed for the production of other clay or composition blocks or bodies.

Having now fully described the invention, what is claimed, and desired to be secured by Letters Patent, is—

1. A machine for molding concrete bodies, comprising in combination a framework and fixed cores projecting therefrom and a mold-box adapted to be raised and lowered about said cores.

2. A machine for molding concrete bodies, comprising in combination a framework and fixed cores projecting therefrom, and a mold-box and bottom plate therefor adapted to be raised and lowered about said cores.

3. A machine for molding concrete bodies comprising in combination a framework and fixed cores projecting therefrom, a mold-box and means for raising the same about the said cores.

4. A machine for molding concrete bodies comprising in combination a framework and fixed cores projecting therefrom, a mold-box, a bottom plate therefor and means for raising and lowering the mold-box and bottom plate about the said cores.

5. A machine for molding concrete bodies comprising in combination a framework and fixed cores supported therein, a mold-box having hinged sides and ends, and means for raising and lowering the said mold-box.

6. A machine for molding concrete bodies comprising in combination a framework, fixed cores, a mold-box having hinged sides and ends, a bottom plate to which the said sides and ends are hinged, means for raising and lowering the said mold-box and means for retaining the sides and ends in a vertical position when the mold-box is in a lowered position and permitting the sides and ends to fold outward when the mold-box is in a raised position.

7. A machine for molding concrete bodies comprising in combination a framework and fixed cores supported therein, a mold-box having its sides and ends hinged at their lower portions and means for retaining said sides and ends in vertical positions until the lower portion of the mold-box is elevated to the top of the frame and means for raising and lowering said mold-box.

8. A machine for molding concrete bodies comprising in combination a framework, a shaft journaled in said framework and pinions on said shaft, of a mold-box having hinged sides and ends and rigid cores adapted to extend within said mold-box, of sliding rack-bars, supporting devices on said rack-bars connected with said mold-box, the teeth of said pinions adapted to gear with the pinions of said rack-bar.

9. A machine for molding composition blocks comprising in combination a framework having connected standards and a fixed bed-plate 10 and fixed cores extending vertically from said bed-plate, a mold-box movably supported above said bed-plate, a bottom plate 18 in said mold-box, a mold-plate 22 removably supported on said bottom plate, the sides and ends of said mold-box being hinged in their lower portions, rollers journaled between the main frame and the mold-box sides and ends and means for raising and lowering said mold-box.

10. A machine for molding composition bodies, comprising in combination a stationary framework, a fixed bed-plate 10 therein, rigid cores 21 rising from said bed-plate, a mold-box above the bed-plate, a bottom plate in the mold-box, vertically-movable rack-bars, mold-box-supporting arms extending from said rack-bars and having a hinge connection with the sides of said mold-box, the ends of said mold-box having a hinge connection with the bottom plate thereof, rollers journaled in the upper portion of the framework and adapted to retain the sides and ends of the mold-box in vertical positions until said mold-box has been elevated to a predetermined height and means for raising and lowering said rack-bars.

11. In a machine for molding concrete bodies, the combination with a framework and fixed cores, of a mold-box having hinged members, and means for raising and lowering said mold-box vertically.

12. In a machine for molding concrete bodies, the combination with a framework and fixed cores, of a mold-box having hinged members, cores associated with the mold-box, and means for raising and lowering said mold-box vertically.

13. In a machine for molding concrete bodies, the combination with a framework and fixed cores, of a mold-box having hinged members, means for raising and lowering the mold-box, and means associated with the framework for retaining the members in a vertical position when the mold-box is in a lowered position and permitting the members to fold outward when the mold-box is raised.

14. In a machine for molding concrete bodies, the combination with a framework and fixed cores, of a mold-box having movable members and a bottom plate associated with the movable members, and means for raising and lowering the bottom plate.

15. In a machine for molding concrete bodies, the combination with a framework and fixed cores, of a mold-box having movable members and a bottom plate associated with the cores, and means for raising and lowering the bottom plate about the cores.

WINGET CONCRETE
MACHINE COMPANY,
By JOSEPH M. McDOWELL,
*Vice-president, duly authorized in the premises.*

In presence of—
HOWARD C. BLACK,
M. B. SCHLEY.